Feb. 1, 1944.  A. SIMMON  2,340,622
EXPOSURE CONTROL FOR PHOTOGRAPHIC CAMERAS
Filed July 31, 1941  2 Sheets-Sheet 1

INVENTOR.
ALFRED SIMMON.
BY Walter E. Wallheim
ATTORNEY

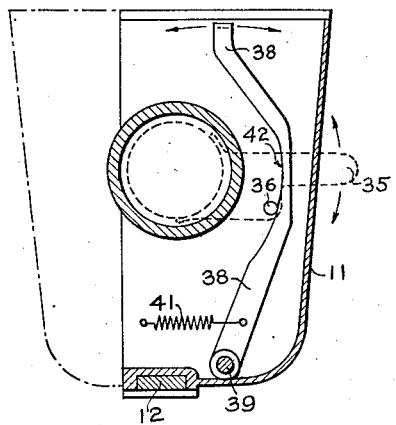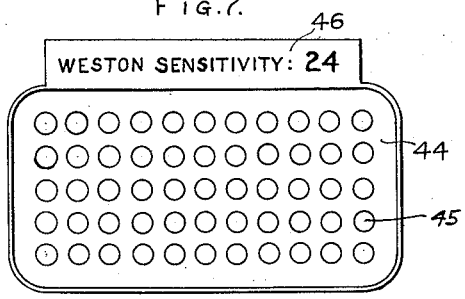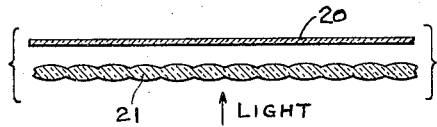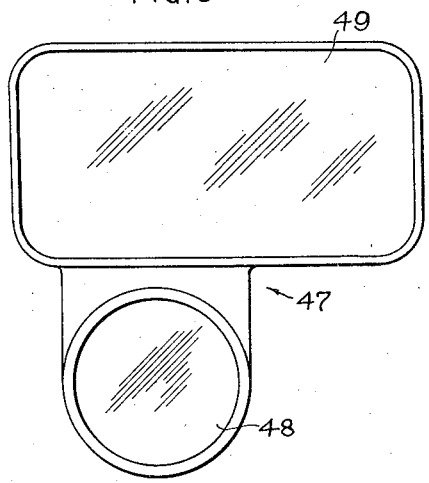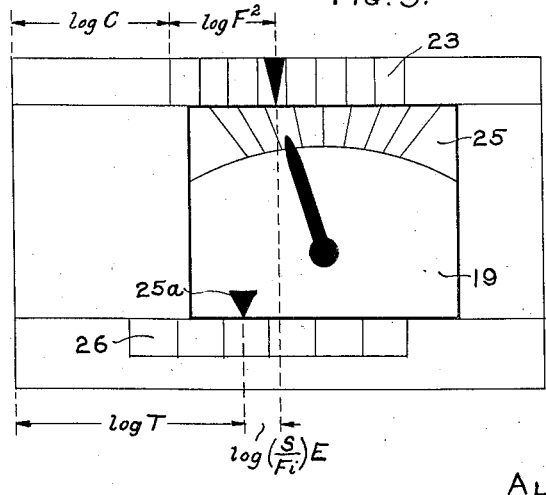

Patented Feb. 1, 1944

2,340,622

UNITED STATES PATENT OFFICE 2,340,622

EXPOSURE CONTROL FOR PHOTOGRAPHIC CAMERAS

Alfred Simmon, Jackson Heights, N. Y.

Application July 31, 1941, Serial No. 404,749

5 Claims. (Cl. 95—10)

This invention refers to cameras and more particularly to cameras having exposure meters built into their casings.

Cameras of this type may be divided into three classes designated as non-automatic, semi-automatic and full-automatic.

In the non-automatic class fall cameras with exposure meters built together in the same housing but otherwise not connected functionally. In other words, the exposure meter does not work in any way different from the usual exposure meter not connected with the camera. The meter is read and then the camera is set by hand in the usual manner.

In the full-automatic class are cameras in which the amount of light admitted to the sensitive film is automatically controlled by an electromagnetic device energized by the current delivered by a photo-electric cell. Since this energy is exceedingly small, such a camera is extremely difficult to construct and is also quite delicate in operation.

The semi-automatic camera is a compromise between the two aforesaid types and provides in an instrument reliable and simple means to attain the desired end. It consists, broadly speaking, of an exposure meter built into a camera which has an adjustable diaphragm and a shutter with adjustable speeds, one or both of these controls being manually adjusted by the operator to a position indicated by the meter.

It is obvious that a camera of the semi-automatic type must comprise a computing device by which all factors governing the proper exposure are automatically coordinated in the proper manner. Cameras of the semi-automatic type have been frequently suggested and numerous patents pertaining to specific constructions have been issued.

It is the particular purpose of this invention to provide a camera of the semi-automatic type having a computing device for coordinating the setting of the diaphragm and the speed adjustment of the shutter with the reading of the exposure meter which forms part of the camera, in a manner which is simpler, easier to construct, and less confusing to the operator than cameras made heretofore.

The proper setting of a camera for obtaining well exposed negatives depends upon five factors, i. e. the brightness of the light reflected by the scene to be photographed, the exposure time, the relative opening of the diaphragm, the sensitivity of the film, and the extension factor of the filter, provided a filter is being used.

These factors can be coordinated in the following manner: The amount of light admitted by the lens is in direct proportion to the brightness of the scene to be photographed (or to the reading of the photo-electric exposure meter), in direct proportion to the exposure time, in inverse proportion to the square of the relative opening of the diaphragm, and in inverse proportion to the filter factor. On the other hand, the amount of light necessary to produce a well exposed negative can be expressed by a properly chosen constant divided by the sensitivity of the photographic emulsion. Thus we have the following equations:

1

$$\text{Amount of light admitted by lens} = \frac{\text{Exposure meter reading} \times \text{Exposure time}}{(\text{Relative diaphragm opening})^2 \times \text{Filter factor}}$$

or $$La = \frac{E \times T}{F^2 \times Fi}$$

2

$$\text{Amount of light required for correctly exposed negative} = \frac{\text{Constant}}{\text{Emulsion sensitivity}}$$

or $$Lr = \frac{C}{S}$$

3

$$La = Lr \text{ or } \frac{E \times T}{F^2 \times Fi} = \frac{C}{S}$$

this can be transformed to read $$\left(\frac{S}{Fi}\right) \times E \times T = C \times F^2$$

or in logarithmic terms:

$$\log\left(\frac{S}{Fi}\right)E + \log T = \log C + \log F^2$$

In the accompanying drawings a preferred, but more or less diagrammatic form of a camera is shown in which means are provided to correlate the four magnitudes expressed in the above formulae. In these drawings Fig. 1 is a front view of the camera;

Fig. 5 is a longitudinal sectional view along the plane of line 5—5 in Fig. 2;

Fig. 6 is a diagrammatic cross-sectional view, at an enlarged scale, through the lenses of a photo-electric cell forming part of the camera and taken along the plane of line 6—6 in Fig. 1;

Fig. 7 is a view of an aperture plate adapted to be placed in front of the lenses of the photo-electric cell for making the reading of the exposure meter correct for a film of given sensitivity;

Fig. 8 is a filter holder consisting of a combination lens and photo cell filter; and Fig. 9 is an enlarged plan view of the slide rule scales giving the readings for the various settings of the camera for the purpose specified.

Like characters of reference denote similar parts throughout the several views and the following specification.

Figure 1:
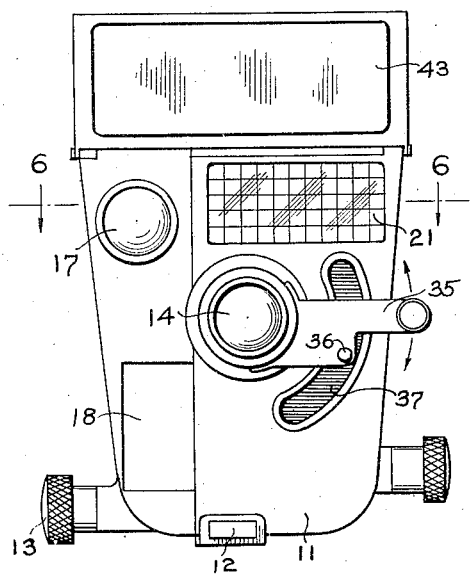
Figure 2:
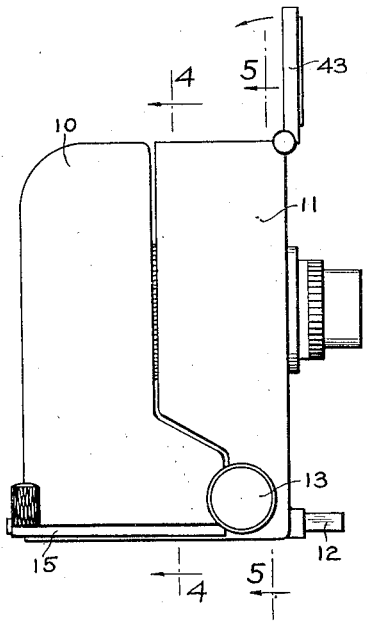
Fig. 2 is a side view of the same.

10 is the rear housing of a camera containing the usual roll film, winding mechanism and preferably, but not necessarily, a focal plane type of shutter, all elements well known in the art and therefore not shown in detail. Similarly in the following description of the parts of the camera, only sufficient details are disclosed to connect the setting mechanism and certain details of the exposure meter with the camera since this invention and its principles of operation are not limited to any particular type of camera. 11 is a front housing of the camera into which are mounted the range and view finder, the lens, exposure meter and associated equipment. In case a lens shutter is being used, this would, of course, also be contained in housing 11. At the bottom of housing 10 is a suitably attached rail 12 upon which housing 11 slides for focusing purposes actuated by a knob 13 operating a rack and pinion in a well known manner. 14 is a lens mounted in housing 11. 15 is a lever at the bottom of housing 10 operating the mechanism for resetting the focal type shutter and simultaneously winding the film for the next exposure.

At the top of the front housing 11 is an aperture for observing a combination view and range finder 16 of the split field or similar type, this finder cooperating with apertures 17 and 18 in the front wall of housing 11. An exposure meter 19, i. e. its electrical instrument, the micro-ammeter, only, is horizontally and slidably mounted adjacent the range finder 16 at the top of the front housing 11, and immediately in back of a somewhat longer photo-electric cell 20 having its lens plate 21 set into the front wall of the housing 11.

22 is a panel, preferably made of transparent plastic material, at the top of housing 11 adjacent the range finger 16 and covering the exposure meter 19. Immediately adjacent the front edge of housing 11, panel 22 has engraved upon it a scale 23 showing relative diaphragm openings or F numbers; and at the side nearest the range finder 16 a scale 24 showing distances. A mark 24a, movably disposed below scale 24, is operatively connected with knob 13 and indicates, after focusing, the distance between the object to be photographed and the camera.

The top of exposure meter 19 has engraved upon it a scale 25 calibrated in logarithms of the brightness values. A pointer moving over that scale is actuated by the photoelectric cell 20 and indicates the amount of light reflected from the object being photographed. A fixed mark 25a is engraved upon the face of exposure meter 19 preferably below scale 25. 26 is a scale indicative of shutter speeds adjacent the side of meter 19 containing the mark 25a with which it cooperates. Exposure meter 19 is slidably disposed immediately below panel 22 between scales 23 and 26.

At the side of the housing 11 is a knob 27 adapted to operate a worm 28 actuating a gear 29 mounted upon a shaft 30. A cam 31 also fixedly secured upon shaft 30 is operatively connected to the shutter for adjusting its speed. A lever 32 has one end fulcrumed upon shaft 30, its other end being provided with a pin 33 adapted to engage a slot 33a in a vertical wall of exposure meter 19, so that by turning knob 27, worm gear 29 rotates and forces lever 32 and pin 33 to move, the latter describing a substantially flat arc causing the exposure meter 19 to travel in a straight line as indicated by arrows in Fig. 4.

35 is a lever for adjusting the diaphragm of the lens of the camera and has a pin 36 which projects through a slot 37 in the front wall of the housing 11 and is in operative connection with a lever 38 having one end rotatably mounted upon a shaft 39 at the bottom of the housing. The other upper end of lever 38 carries a mark 40 which travels below scale 23 on panel 22 indicating thereon the actual setting of the diaphragm. A spring 41 urges lever 38 to be in contact with pin 36. A cam-like edge 42 of lever 38 is calculated in such a way that the indicating mark 40 receives a movement corresponding to the logarithmic divisions of scale 23.

A hinged cover 43 is provided for at the top of housing 11 for the protection of the view finder, exposure meter, and the various scales.

Figures 3, 4:
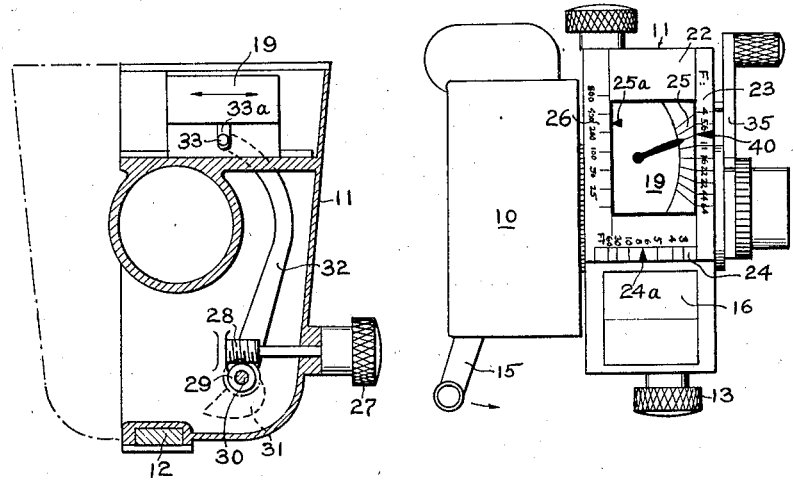
Fig. 3 is a plan view of the same; with a cover over indicating and adjusting mechanism removed.
Fig. 4 is a longitudinal sectional view, partly in elevation, along the plane of line 4—4 in Fig. 2.

Reverting to the various scales at the top of the camera as shown in Figs. 3 and 9, there are two scales, namely, 26 indicative of the logarithms of the exposure time or shutter speed and 23 expressing the logarithms of the square of the relative diaphragm opening or the so-called F numbers of the lens. The exposure meter 19 is slidably disposed between these scales and is itself equipped with scale 25 calibrated in logarithms of the brightness values and mark 25a. In order to set the camera, the operator first chooses the speed which he wants to use and which depends essentially upon the speed with which the object to be photographed moves. It is generally preferable to use the slowest speed which still would render an unblurred picture so that the smallest possible stop of the diaphragm can be used which would result in the greatest possible depth of focus of the lens. This is accomplished by manipulating knob 27 which in turn by means of worm 28, gear 29, lever 32 and pin 33 engaging the slot 33a of the exposure meter 19, shifts the meter from right to left or from left to right until the mark 25a registers with the desired speed. The camera is then pointed toward the object to be photographed and, depending upon the light reflected by the object and transmitted by the photo-electric cell 20 and its lens 21 to the exposure meter 19, causes the pointer of the meter to assume a certain position as shown, for instance, in Figs. 3 and 9. The operator then sets the iris diaphragm of the lens by manipulating lever 35 which by virtue of pin 36, lever 38 and its cam 42, moves the mark 40 carried upon the upper end of lever 38 until mark 40 registers with the pointer of the exposure meter. If the constants of the various adjustments are chosen properly, the camera will then automatically be set for a correct exposure. The focusing is, of course, obtained in the usual manner by manipulating knob 13 until the images in the range finder coincide when the mark 24a, cooperating with scale 24 and operatively connected with knob 13, also indicates the distance between the object being photographed and the camera, or by ascertaining the distance and then focusing by knob 13 until mark 24a registers with this distance.

In the basic equations, deduced hereinbefore, the first term reads $$\left(\frac{S}{Fi}\right) \times E$$

This simply means that the sensitivity of the meter must increase or decrease in direct ratio with the sensitivity of the photographic emulsion which happens to be used, and in inverse proportion to the filter factor. It would, of course, be easily possible to extend the slide rule principle so as to embrace these factors as well, but in practice it would be preferable to use electrical or optical means by which the sensitivity of the meter can be reduced in a simpler and more foolproof manner. In the embodiment of this invention I prefer to use optical means which are less liable to fail.

In front of the photo-electric cell are usually devices which restrict the acceptance angle of the cell to substantially the angle covered by the lens of the camera. These devices consist usually of a relatively large number of small lenses as shown diagrammatically in section in Fig. 6. It is an easy matter to arrange in front of these lens sets plates 44, as shown in Fig. 7, through which a number of holes 45 are drilled. These holes constitute in effect diaphragms for the small lenses, and it will be clear that larger holes will admit more, and smaller holes less light. A plate with holes of a properly chosen diameter will modify the sensitivity of the meter in such a manner that its reading will be correct for a negative emulsion of given sensitivity. Usually with roll film cameras, a relatively large number of pictures are taken using negative material of the same sensitivity and therefore plate 44 needs to be exchanged only rarely so that elaborate adjusting devices may be dispensed with. Plates 44 may be preferably marked with a legend as at 46, for instance, denoting the "Weston" sensitivity of the film. It is obvious that such plates must be changed only when the operator chooses to use a brand of film having a sensitivity different from the one used heretofore. The advantage of this non-adjustable plate is its accuracy, simplicity, and fool-proofness since all movable parts are eliminated.

In Fig. 8 is shown a filter mount or holder consisting of a plate 47 adapted to be slipped over the main lens 14 or otherwise fastened to the front of the camera housing 11 in any suitable manner. The holder 47 has openings 48 and 49 for mounting therein, respectively, a colored filter in front of the lens and an auxiliary gray filter in front of the photo-electric cell. It is expedient to combine the two mounts into one rigid unit as shown in Fig. 8 so that the gray filter is automatically placed in front of the photo-electric cell whenever the colored filter is placed in front of the camera lens. For example, if a light yellow filter is used which would call for an extension factor of 2, automatically a gray filter will be placed in front of the photo-electric cell admitting only half the light otherwise admitted so that the sensitivity of the exposure meter is thereby automatically reduced by the proper factor.

It is, of course, understood that there are many modifications for attaining the same end as with the filter mount above described. For instance, instead of a gray colored filter, a fine wire mesh disc could be used or, if a photo-electric cell is used of approximately the same color response as the film, one filter large enough to cover both lens and cell may be employed. It is also within the scope of the invention to use a plate similar to the one shown in Fig. 7, i. e. a perforated diaphragm plate, in place of the gray filter over the cell to allow for different filter factors, and use a gray filter or its equivalent to allow for different negative sensitivities.

It is to be distinctly understood that the various devices disclosed are applicable to different types of cameras and that the type illustrated diagrammatically is used by way of example only.

The structure exemplifying the application of the slide rule principle is, of course, subject to various modifications under the doctrine of mechanical equivalents. So, for instance, the lower scale giving shutter speeds and its relation to the fixed mark upon the face of the exposure meter with which it cooperates, could be reversed and the shutter speed scale marking be placed upon the lower part of the face of the exposure meter, while the fixed mark may be placed upon the scale adjacent that lower face.

It is obvious that many other modifications may be made in the instrumentalities disclosed without departing from the principles of the invention, as defined in the appended claims.

What I claim as new, is:

1. Exposure control in a photographic camera having adjusting mechanism for shutter speeds and diaphragm openings comprising slide rule mechanism consisting of a straight scale calibrated in values of diaphragm openings, another straight scale calibrated for shutter speeds, an exposure meter slidably disposed between said scales, lever and cam means operatively connecting said shutter speed adjusting mechanism to said exposure meter and adapted to bring said meter in registry with a desired shutter speed of said scale calibrated for shutter speeds, and indicating means operatively connected with said diaphragm adjusting mechanism and cooperating with said scale calibrated in values of diaphragm openings adapted to be set according to readings of said exposure meter to adjust the diaphragm opening to proper size after said exposure meter has been brought in registry with a desired speed on said scale calibrated for shutter speeds.

2. Exposure control in a photographic camera having adjusting mechanisms for shutter speeds and diaphragm openings comprising slide rule mechanism consisting of a straight scale calibrated in values of diaphragm openings, another straight scale calibrated for shutter speeds, an exposure meter slidably disposed between said scales, lever and cam means operatively connecting said shutter speed adjusting mechanism to said exposure meter and adapted to bring said meter in registry with a desired shutter speed of said scale calibrated for shutter speeds, indicating means cooperating with said scale calibrated in values of diaphragm openings, and lever and cam means operatively connecting said indicating means with said diaphragm adjusting mechanism, said indicating means adapted to be set according to readings of said exposure meter to adjust the diaphragm opening to proper size after said exposure meter has been brought in registry with a desired speed on said scale calibrated for shutter speeds.

3. Exposure control in a photographic camera having adjusting mechanisms for shutter speeds and diaphragm openings, comprising a straight scale calibrated in values of diaphragm openings, and a movable mark operatively connected with said diaphragm adjusting mechanism and cooperating with said scale, another straight scale calibrated for shutter speeds, an exposure meter movable between said scales and operatively connected to said shutter speed mechanism and having a pointer and a scale indicative of brightness values and a fixed mark, lever and cam mechanism adapted to bring said latter mark to register with a desired shutter speed on said scale calibrated for shutter speeds, and other lever and cam mechanism adapted to bring said movable mark to register with said pointer whereby the diaphragm opening of the camera will be adjusted to proper size.

4. Exposure control in a photographic camera having adjusting mechanisms for shutter speeds and diaphragm openings, comprising a straight scale calibrated in values of diaphragm openings, and a movable mark operatively connected with said diaphragm adjusting mechanism and cooperating with said scale, another scale parallel to said straight scale calibrated for shutter speeds, an exposure meter movable between said scales and operatively connected to said shutter speed mechanism and having a pointer and a scale indicative of brightness values, and a mark fixed upon said meter adapted to be brought to register with a desired shutter speed on said scale calibrated for shutter speeds, said movable mark adapted to be brought to register with said pointer whereby the diaphragm opening of the camera will be adjusted to proper size.

5. Exposure control in a photographic camera having adjusting mechanisms for shutter speeds and diaphragm openings, comprising a straight scale calibrated in logarithmic values of the squares of relative diaphragm openings, and a movable mark operatively connected with said diaphragm adjusting mechanism and cooperating with said scale, another straight scale calibrated in logarithmic values of shutter speeds, and an exposure meter movable between said scales and operatively connected to said shutter speed mechanism and having a pointer and a scale indicative of logarithmic values of brightness values and a fixed mark, the latter mark adapted to be brought to register with a desired shutter speed on said scale calibrated for shutter speeds and said movable mark adapted to be brought to register with said pointer whereby the diaphragm opening of the camera will be adjusted to proper size.

ALFRED SIMMON.